US012744597B2

(12) United States Patent
Sun et al.

(10) Patent No.: US 12,744,597 B2
(45) Date of Patent: Sep. 22, 2026

(54) COMMUNICATION METHOD, APPARATUS, AND SYSTEM

(71) Applicant: HUAWEI TECHNOLOGIES CO., LTD., Shenzhen (CN)

(72) Inventors: Huan Sun, Shenzhen (CN); Xu Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 18/533,322

(22) Filed: Dec. 8, 2023

(65) Prior Publication Data

US 2024/0137121 A1 Apr. 25, 2024
US 2024/0235675 A9 Jul. 11, 2024

Related U.S. Application Data

(63) Continuation of application No. PCT/CN2022/096090, filed on May 30, 2022.

(30) Foreign Application Priority Data

Jun. 11, 2021 (CN) ........................ 202110653845.0

(51) Int. Cl.
*H04B 10/11* (2013.01)
*H04B 10/112* (2013.01)
*H04B 10/516* (2013.01)

(52) U.S. Cl.
CPC ......... *H04B 10/112* (2013.01); *H04B 10/516* (2013.01)

(58) Field of Classification Search
CPC ................................................. H04B 7/04013
See application file for complete search history.

(56) References Cited

U.S. PATENT DOCUMENTS 12,389,484 B2 * 8/2025 Åström ................. H04W 76/19
2017/0135078 A1 * 5/2017 Lim ...................... H04L 5/0044
(Continued)

FOREIGN PATENT DOCUMENTS

CN 112272183 A 1/2021

OTHER PUBLICATIONS

Optical RIS: M. Najafi, B. Schmauss and R. Schober, "Intelligent Reflecting Surfaces for Free Space Optical Communication Systems," in IEEE Transactions on Communications, vol. 69, No. 9, pp. 6134-6151, Sep. 2021, doi: 10.1109/TCOMM.2021.3084637. (Year: 2021).*

(Continued)

*Primary Examiner* — Nathan M Cors

(57) ABSTRACT

A communication method, apparatus, and system are disclosed. The system includes: a reconfigurable intelligent surface, a receiver, and a transmitter configured to send an optical signal to a reconfigurable intelligent surface, wherein the reconfigurable intelligent surface is configured to: detect the optical signal to obtain first target information, modulate the first target information to generate an electrical signal, and send the electrical signal to a receiver, where the first target information is the detected optical signal; and generate the electrical signal based on the optical signal, and send the electrical signal to the receiver; and the receiver is configured to detect the electrical signal to obtain second target information, and demodulate the second target information to obtain data information and/or control information carried in the optical signal, where the second target information is the detected electrical signal.

17 Claims, 7 Drawing Sheets

(56) References Cited

U.S. PATENT DOCUMENTS

| | | | | |
|---|---|---|---|---|
| 2017/0223626 | A1* | 8/2017 | Zhuang | H04W 48/20 |
| 2022/0321200 | A1* | 10/2022 | Abedini | H04B 7/155 |
| 2022/0400462 | A1* | 12/2022 | Dai | G01S 11/04 |
| 2023/0362847 | A1* | 11/2023 | Ly | H04W 56/001 |
| 2024/0187116 | A1* | 6/2024 | Xu | H04B 17/345 |

OTHER PUBLICATIONS

Appendix (anatomy), Wikipedia, URL:https://en.wikipedia.org/wiki/Main_Page,Oct. 5, 2002,total 10 pages.

International Search Report and Written Opinion issued in PCT/CN2022/096090, dated Aug. 18, 2022, 10 pages.

* cited by examiner

COMMUNICATION METHOD, APPARATUS, AND SYSTEM

CROSS-REFERENCE TO RELATED APPLICATIONS

This application is a continuation of International Application No. PCT/CN2022/096090, filed on May 30, 2022, which claims priority to Chinese Patent Application No. 202110653845.0, filed on Jun. 11, 2021. The disclosures of the aforementioned applications are hereby incorporated by reference in their entireties.

TECHNICAL FIELD

Embodiments of the present disclosure relate to the field of communication technologies, and in particular, to a communication method, apparatus, and system.

BACKGROUND

In a $5^{th}$ generation (5G) wireless access network, scopes of a mobile digital terminal and a communication medium undergo revolutionary changes. Massive data generated accordingly imposes higher requirements on a high rate and a low latency of a communication system, and this brings a great challenge to conventional communication access network technologies. In this background, a new communication manner, wireless optical communication, featuring expanded spectrum resources, green and energy-saving, and high-speed mobile access, has emerged. A wireless optical transmission technology has the following advantages: Spectrum resources are rich, where a spectrum bandwidth of only visible light is about hundreds of THZ, which is a blank field to be researched by humans. Application scenarios are wide, and functions such as light emitting, communication, and control and positioning all are included. The wireless optical transmission technology has no radio interference, no electromagnetic radiation, and high confidentiality, and is one of the most effective ways to resolve a problem that conventional radio communication cannot be used. A communication rate is high, and a transmission rate of more than 10 gigabits per second can be achieved in an experiment. This advantage makes visible light communication an indispensable wireless communication manner in a future intelligent era.

Wireless optical communication is one of potential key technologies in the $6^{th}$ generation (6G), and has been researched globally. Many projects in Japan, the United States, and the European Union focus on wireless optical communication. In addition, the Ministry of Science and Technology of China has included visible light communication in key research and development plans and set up a visible light (visible light communication, VLC) working group in IMT-2030 to promote research and standardization of key solutions.

As shown in FIG. 1, a basic architecture of an existing wireless optical communication system includes three parts: an optical transmitter, an optical channel, and an optical receiver. A main processing procedure of data information in each module in wireless optical transmission is as follows: A baseband binary signal is first processed through encoding, modulation, pre-equalization, and the like, and after digital-to-analog conversion is performed on an obtained signal, a converted signal drives the optical transmitter to control luminous intensity of the signal, to implement conversion from an electrical signal to an optical signal. To converge optical transmission energy to implement long-distance transmission, a component such as an optical lens is used after the optical transmitter to further improve signal strength of the receiver. An adjusted optical signal is propagated in a free space channel to arrive at the optical receiver. In the foregoing wireless optical communication system, the receiver needs to support optical communication, and the requirement on the receiver is high.

SUMMARY

Embodiments of the present disclosure provide a communication method, apparatus, and system, to reduce a requirement on a receiver.

According to a first aspect, a communication system is provided, including: a transmitter, configured to send an optical signal to a reconfigurable intelligent surface; the reconfigurable intelligent surface, configured to: detect the optical signal to obtain first target information, modulate the first target information to generate an electrical signal, and send the electrical signal to a receiver, where the first target information is the detected optical signal; and generate the electrical signal based on the optical signal, and send the electrical signal to the receiver; and the receiver, configured to detect the electrical signal to obtain second target information, and demodulate the second target information to obtain data information and/or control information carried in the optical signal, where the second target information is the detected electrical signal.

According to the foregoing embodiment, the receiver does not need to support an optical function, and can directly receive the electrical signal, so that a requirement on the receiver can be reduced. In addition, because a communication distance of optical communication is short, and a radio electromagnetic wave is transmitted between the reconfigurable intelligent surface and the receiver, a communication distance of an entire communication system can be prolonged.

In an example embodiment, when generating the electrical signal based on the optical signal, the reconfigurable intelligent surface may specifically detect the optical signal to obtain the first target information; modulate the first target information based on a modulation scheme of the electrical signal, to obtain first information; determine, based on correspondences between different information and voltages, a first voltage corresponding to the first information; control, based on the first voltage, parameters of units in a reconfigurable intelligent surface array included in the reconfigurable intelligent surface; and generate a carrier signal, and use the carrier signal as an incident wave to irradiate the incident wave onto the reconfigurable intelligent surface array, so that the units in the reconfigurable intelligent surface array reflect the incident wave based on the parameters of the units to generate corresponding reflected waves, where the reflected waves are the generated electrical signal.

According to the foregoing embodiment, the reconfigurable intelligent surface is used as a passive device, and costs are low. Compared with a pure optical communication system, the reconfigurable intelligent surface is used to implement conversion between the optical signal and the electrical signal, and a requirement on the receiver is reduced and a transmission distance is prolonged without greatly improving power consumption and costs of the entire communication system.

In an example embodiment, the reconfigurable intelligent surface may be further configured to adjust the first information based on first beamforming information.

According to the foregoing embodiment, the first beamforming information corresponding to a location of the receiver is added to the electrical signal, so that the electrical signal can be directionally transmitted to the receiver, thereby improving a signal-to-noise ratio of the electrical signal received by the receiver and improving communication performance.

In an example embodiment, when demodulating the second target information to obtain the data information and/or the control information carried in the optical signal, the receiver may specifically detect the electrical signal to obtain the second target information; demodulate the second target information based on a modulation scheme of the electrical signal, to obtain demodulated information; and reassemble and/or descramble bits of the demodulated information based on a modulation scheme of the optical signal, to obtain the data information and/or the control information carried in the optical signal.

According to the foregoing embodiments, when obtaining the demodulated information after demodulating the detected electrical signal, that is, the second target information, the receiver directly reassembles and/or descrambles the bits of the demodulated information based on an adjustment manner of the optical signal, to obtain information originally carried in the optical signal. In an original modulation process of the optical signal, processes such as bit reassembling and/or bit scrambling are performed on the optical signal. When obtaining the demodulated signal, the receiver performs inverse processing of the foregoing reassembling and/or scrambling on the demodulated signal to restore the original information, so that accuracy of restoring the original information is high.

In another example embodiment, when demodulating the second target information to obtain the data information and/or the control information carried in the optical signal, the receiver may specifically detect the electrical signal to obtain the second target information; demodulate the second target information based on a modulation scheme of the electrical signal, to obtain demodulated information; determine an optical signal modulation scheme corresponding to the electrical signal modulation scheme; and process the demodulated information based on an optical vector signal corresponding to the optical signal modulation scheme, to obtain the data information and/or the control information carried in the optical signal.

According to the foregoing embodiment, the receiver obtains the demodulated information after demodulating the detected electrical signal, that is, the second target information, and then processes the demodulated information based on the optical vector signal corresponding to the optical modulation scheme, to restore the original data information carried in the optical signal. A processing process is simple, and power consumption of the receiver is reduced.

In an example embodiment, a frame structure of the electrical signal may include a control channel timeslot and a data channel timeslot, the data channel timeslot is used to transmit data information of the electrical signal, and the control channel timeslot is used to transmit any one of the following information: transmitting a reference signal, where the reference signal is used for synchronization between the reconfigurable intelligent surface and the receiver, and/or is used for channel estimation of the receiver; and transmitting an information conversion indication, where the information conversion indication is used to notify the receiver of a modulation scheme of a current carrier parameter and a mapping relationship between an optical modulation scheme and an electrical modulation scheme.

According to the foregoing embodiment, parameter information is transmitted in the control channel timeslot, so that synchronization between the reconfigurable intelligent surface and the receiver, channel estimation of the receiver, and the like can be implemented.

In an example embodiment, the control channel timeslot may include a guard area, and the guard area is a guard interval reserved between the control channel timeslot and the data channel timeslot.

According to the foregoing embodiment, the guard interval is reserved between the control channel timeslot and the data channel timeslot, so that the control channel timeslot and the data channel timeslot do not interfere with each other in a multipath case.

According to a second aspect, a communication method is provided, including: detecting, by a reconfigurable intelligent surface, an optical signal from a transmitter to obtain first target information, where the first target information is the detected optical signal; modulating, by the reconfigurable intelligent surface, the first target information based on a modulation scheme of an electrical signal, to generate the electrical signal; and sending, by the reconfigurable intelligent surface, the electrical signal to a receiver.

In an example embodiment, the modulating, by the reconfigurable intelligent surface, the first target information based on a modulation scheme of an electrical signal, to generate the electrical signal includes: modulating the first target information based on the modulation scheme of the electrical signal, to determine first information; determining, based on the correspondences between different information and voltages, a first voltage corresponding to the first information; controlling, based on the first voltage, parameters of units in a reconfigurable intelligent surface array included in the reconfigurable intelligent surface; and generating a carrier signal, and using the carrier signal as an incident wave to irradiate the incident wave onto reconfigurable intelligent surface array, so that the units in the reconfigurable intelligent surface array reflect the incident wave based on the parameters of the units to generate corresponding reflected waves, where the reflected waves are the generated electrical signal.

In an example embodiment, in the process of determining the first information, the first information may be further adjusted based on first beamforming information.

In an example embodiment, a frame structure of the electrical signal may include a control channel timeslot and a data channel timeslot, the data channel timeslot is used to transmit data information of the electrical signal, and the control channel timeslot is used to transmit any one of the following information: transmitting a reference signal, where the reference signal is used for synchronization between the reconfigurable intelligent surface and the receiver, and/or is used for channel estimation of the receiver; and transmitting an information conversion indication, where the information conversion indication is used to notify the receiver of a modulation scheme of a current carrier parameter and a mapping relationship between an optical modulation scheme and an electrical modulation scheme.

In an example embodiment, the control channel timeslot includes a guard area, and the guard area is a guard interval reserved between the control channel timeslot and the data channel timeslot.

According to a third aspect, a communication method is provided, including: detecting, by a receiver, an electrical signal from a reconfigurable intelligent surface to obtain second target information, where the second target information is the detected electrical signal; and demodulating, by the receiver, the second target information to obtain data information and/or control information carried in an optical signal.

In an example embodiment, the demodulating the second target information to obtain data information and/or control information carried in an optical signal includes: demodulating the second target information based on a modulation scheme of the electrical signal, to obtain demodulated information; and reassembling and/or descrambling bits of the demodulated information based on a modulation scheme of the optical signal, to obtain the data information and/or the control information carried in the optical signal.

In another example embodiment, the demodulating the second target information to obtain data information and/or control information carried in an optical signal includes: demodulating the second target information based on a modulation scheme of the electrical signal, to obtain demodulated information; determining an optical signal modulation scheme corresponding to the electrical signal modulation scheme; and processing the demodulated information based on an optical vector signal corresponding to the optical signal modulation scheme, to obtain the data information and/or the control information carried in the optical signal.

In an example embodiment, a frame structure of the electrical signal may include a control channel timeslot and a data channel timeslot, the data channel timeslot is used to transmit data information of the electrical signal, and the control channel timeslot is used to transmit any one of the following information: transmitting a reference signal, where the reference signal is used for synchronization between the reconfigurable intelligent surface and the receiver, and/or is used for channel estimation of the receiver; and transmitting an information conversion indication, where the information conversion indication is used to notify the receiver of a modulation scheme of a current carrier parameter and a mapping relationship between an optical modulation scheme and an electrical modulation scheme.

In an example embodiment, the control channel timeslot includes a guard area, and the guard area is a guard interval reserved between the control channel timeslot and the data channel timeslot.

According to a fourth aspect, a communication apparatus is provided. The apparatus is configured to implement the method according to the second aspect, and includes corresponding functional modules or units, which are respectively configured to implement the steps in the method according to the second aspect. Functions may be implemented by hardware, or may be implemented by hardware by executing corresponding software. The hardware or the software includes one or more modules or units corresponding to the foregoing function.

According to a fifth aspect, a communication apparatus is provided. The apparatus includes a processor and a memory. The memory stores a computer program or instructions, and the processor is coupled to the memory. When the processor executes the computer program or the instructions, the apparatus is enabled to perform the method according to any example embodiment in the second aspect.

According to a sixth aspect, a communication apparatus is provided. The apparatus is configured to implement the method according to the third aspect, and includes corresponding functional modules or units, which are respectively configured to implement the steps in the method according to the third aspect. Functions may be implemented by hardware, or may be implemented by hardware by executing corresponding software. The hardware or the software includes one or more modules or units corresponding to the foregoing function.

According to a seventh aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method according to any example embodiment in the third aspect.

According to an eighth aspect, a computer-readable storage medium is provided. The computer-readable storage medium stores a computer program or instructions, and when the computer program or the instructions are executed by an apparatus, the apparatus is enabled to perform the method according to any example embodiment in the second aspect.

According to a ninth aspect, a computer-readable storage medium is provided. The computer-readable storage medium stores a computer program or instructions, and when the computer program or the instructions are executed by an apparatus, the apparatus is enabled to perform the method according to any example embodiment in the third aspect.

According to a tenth aspect, a computer program product is provided. The computer program product includes a computer program or instructions, and when the computer program or the instructions are executed by an apparatus, the apparatus is enabled to perform the method according to any example embodiment in the second aspect.

According to an eleventh aspect, a computer program product is provided. The computer program product includes a computer program or instructions, and when the computer program or the instructions are executed by an apparatus, the apparatus is enabled to perform the method according to any example embodiment in the third aspect.

For technical effects that can be brought by any example embodiment in any one of the second aspect to the eleventh aspect, refer to the descriptions of the technical effects that can be achieved by any example embodiment in the first aspect. Details are not described herein again.

DESCRIPTION OF EMBODIMENTS

The following describes the technical solutions in embodiments of the present disclosure with reference to the accompanying drawings in embodiments of the present disclosure.

Figures 1, 2:
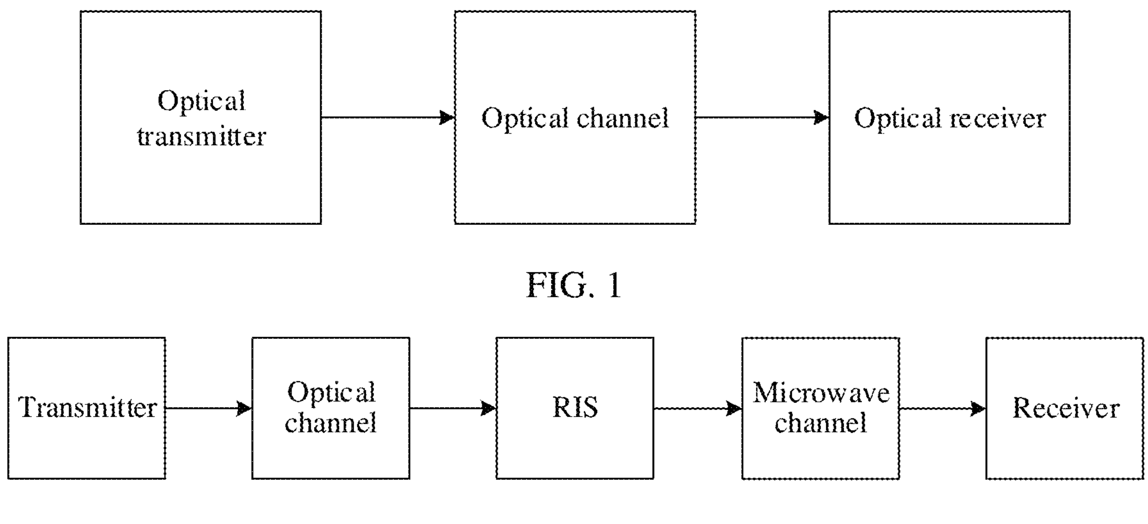
FIG. 1 is a schematic diagram of a communication system.
FIG. 2 is a schematic diagram of a communication system according to an embodiment of the present disclosure.

FIG. 2 is a schematic diagram of a communication system according to an embodiment of the present disclosure. The communication system includes at least a transmitter, a reconfigurable intelligent surface (RIS), a receiver, and the like. The transmitter may be an optical transmitter, a channel between the optical transmitter and the RIS is an optical channel, and a channel between the RIS and the receiver is a radio electromagnetic wave channel, or referred to as a microwave channel. Example working principles of the optical transmitter, the RIS, and the receiver are respectively described below.

1. Optical Transmitter

The optical transmitter may generate an optical signal by performing processes such as encoding, modulation, electrical-to-optical conversion, and optical processing on to-be-transmitted information (the information may be data information, control information, and/or the like). The optical signal passes through the optical channel and reaches the RIS.

2. RIS

A key component in this embodiment is the RIS. The following focuses on descriptions of functions of the RIS.

The RIS detects the optical signal to obtain first target information, where the first target information may be a detected optical/electrical signal. The first target information may include information such as an amplitude and/or a phase of the optical signal. For ease of description and differentiation, the information such as the amplitude and/or the phase of the optical signal included in the optical signal detected by the RIS, that is, the first target information, may be referred to as a first amplitude and a first phase. The RIS modulates the first target information to generate an electrical signal. For example, the RIS may modulate the first target information based on a modulation scheme of the electrical signal, to determine first information. For example, the RIS may modulate (process or convert), based on the modulation scheme of the electrical signal, the information such as the first amplitude and/or the first phase of the optical signal included in the first target information, to obtain a second amplitude and/or a second phase. The first information includes the second amplitude and/or the second phase. It should be understood that the foregoing process of modulating the first amplitude and/or the first phase is related to the modulation scheme used by the RIS for the electrical signal. For example, the modulation scheme of the electrical signal includes quadrature amplitude modulation (QAM), binary phase shift keying (BPSK), and the like. If the QAM modulation scheme is used, the amplitude of the detected optical signal may be changed, and the phase is not changed. In other words, only the first amplitude in the first target information is changed, and the first phase in the first target information is not changed. Alternatively, if the BPSK modulation scheme is used, the phase of the detected optical signal may be changed, and the amplitude is not changed. In other words, only the first phase in the first target information is changed, the first amplitude in the first target information is not changed, and the like. Alternatively, both the amplitude and the phase of the detected optical signal may be changed. This is not limited.

Subsequently, the RIS may determine, based on correspondences between different information and voltages, a first voltage corresponding to the first information. In this embodiment, the RSI may prestore correspondences between different amplitudes and/or phases and voltages. The RIS may search the correspondences for a voltage corresponding to the second amplitude and/or the second phase included in the first information, and the voltage may be referred to as the first voltage.

The RIS may configure or control, based on the first voltage, parameters of units in an RIS array included in the RIS, for example, parameters such as impedance.

The RIS generates a carrier signal, and uses the carrier signal as an incident wave to irradiate the incident wave onto the RIS array. The units in the RIS array reflect the incident wave based on the parameters of the units, to generate corresponding reflected waves, where the reflected waves may be considered as a modulated electrical signal.

Optionally, in the foregoing process, the RIS may alternatively first adjust the first information based on first beamforming information, and then determine first voltage corresponding to adjusted first information, so that the determined first voltage is more accurate, and a subsequently obtained electrical signal is more precise.

The foregoing example is still used, and the first information includes the second amplitude and/or the second phase. In this embodiment, the RIS may first adjust the second phase in the first information based on the first beamforming information, and an adjusted second phase may be referred to as a third phase, that is, the adjusted first information includes the second amplitude and/or the third phase. Then, the RIS searches the correspondences for a voltage corresponding to the second amplitude and/or the third phase included in the first information, to obtain the first voltage.

The first beamforming information may be obtained by the RIS from the optical signal, or the RIS may determine the first beamforming information based on location information of a receive end.

Through the foregoing processing, the electrical signal can be directionally transmitted to the receiver, thereby improving a signal-to-noise ratio of the electrical signal received by the receiver and improving communication performance.

It should be noted that, in this embodiment, the RIS may send the generated electrical signal to one receiver, or send the generated electrical signal to a plurality of receivers, or the like. This is not limited. If the electrical signal is sent to a plurality of receivers, and the plurality of receivers are at different locations, for different receivers, the RIS may add different beamforming information to the electrical signal. Certainly, in this embodiment, the RIS may alternatively send the electrical signal in a unicast manner, a multicast manner, a broadcast manner, or the like. This is not limited. Further, for an electrical signal sent to a same receiver, as the receiver moves and a location changes, beamforming information added to the electrical signal may also be different. For example, a receiver A is at a location A at a moment 1, and the RIS may determine beamforming information A based on the location A, and adjust the electrical signal based on the beamforming information A; and the RSI sends an adjusted electrical signal to the receiver A. The receiver A is at a location B at a moment 2, and the RIS may determine beamforming information B based on the location B, and adjust the electrical signal based on the beamforming information B; and the RIS sends an adjusted electrical signal to the receiver A.

Figure 3:
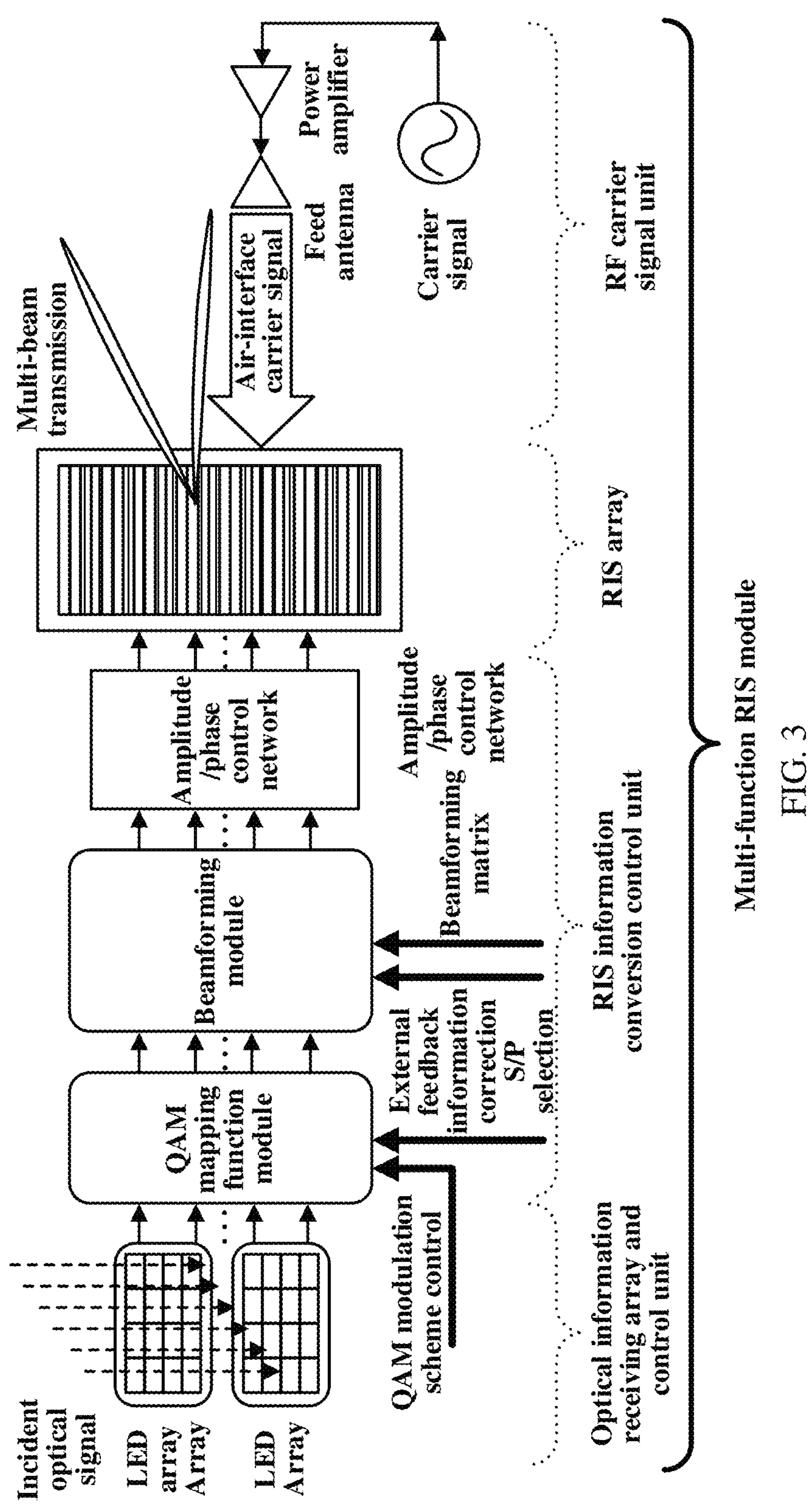
FIG. 3 is a schematic diagram of a reconfigurable intelligent surface (RIS) according to an embodiment of the present disclosure.

In an example embodiment, as shown in FIG. 3, the RIS may include: a light-emitting diode (LED) array, a mapping function module, a beamforming module, an amplitude/phase control network, an RIS array, and/or a radio frequency (RF) carrier signal unit.

The LED array is configured to detect an optical signal to obtain information such as an amplitude and/or a phase of the optical signal. For ease of description, the information may be referred to as information about a first amplitude and/or a first phase, that is, the information about the first amplitude and/or the first phase are/is information about an original amplitude and/or an original phase of the optical signal. The mapping function module is configured to modulate or convert the first amplitude and/or the first phase to obtain a second amplitude and/or a second phase. It should be noted that, a specific processing manner of the mapping function module is related to an electrical modulation scheme used by the RIS, and reference may be made to the foregoing description. The beamforming module is configured to convert the second amplitude and/or the second phase to obtain the second amplitude and/or a third phase. It should be noted that, the RIS may obtain beamforming information of the optical signal, and adjust the second phase based on the beamforming information to obtain the third phase. Alternatively, the original optical signal may not carry the beamforming information, and the RIS may determine the beamforming information based on a location of the receiver, so that the electrical signal is directionally sent to the receiver, thereby improving a signal-to-noise ratio of the receiver and improving communication performance. The amplitude/phase control network is configured to determine a first voltage based on the second amplitude and/or the third phase. Specifically, in the amplitude/corresponding control network, a correspondence between an amplitude and/or a phase and a voltage may be prestored, and the correspondence may be searched for a voltage corresponding to the second amplitude and/or the third phase, where the voltage is the first voltage. In addition, the first voltage may be loaded to units in the RIS array, and parameters of the units in the RSI array may be configured or adjusted by using the first voltage. Finally, the carrier signal unit generates a carrier signal, and uses the carrier signal as an incident wave to irradiate the incident wave onto the RIS array. The units in the RIS array generate corresponding reflected waves based on the parameters of the units, where the reflected waves are the electrical signal transmitted by the RIS.

3. Receiver

The receiver detects an electrical signal from the RIS to obtain second target information, where the second target information is the electrical signal detected by the receiver. The receiver demodulates the second target information to obtain data information and/or control information and the like carried in an optical signal.

In an example embodiment, the receiver may demodulate the second target information based on a modulation scheme of the electrical signal, to obtain demodulated information. The receiver may prestore a correspondence between an electrical modulation scheme and an optical modulation scheme, to obtain an optical modulation scheme corresponding to the electrical modulation scheme. The receiver performs, based on the optical modulation scheme, operations such as reassembling and/or descrambling on bits of the demodulated information, to obtain the data information and/or the control information carried in the optical signal. Alternatively, the receiver may process the demodulated information based on an optical vector signal corresponding to the optical modulation scheme, to obtain the data information and/or the control information carried in the optical signal. It should be noted that, generally, there is a correspondence between an electrical modulation scheme and an optical modulation scheme. When performing electrical modulation on a detected optical signal, the RIS may query an electrical modulation scheme corresponding to a current optical modulation scheme, and modulate the detected optical signal based on the found electrical modulation scheme. Alternatively, the RIS may use another electrical modulation scheme, and the electrical modulation scheme may not have a correspondence with the current optical modulation scheme. In this case, the RIS may notify the receiver of a currently used electrical modulation scheme. To be specific, if the receiver receives the foregoing notification, the receiver demodulates detected electrical information based on the electrical modulation scheme indicated in the notification; or if the receiver does not receive the notification information, the receiver demodulates the detected electrical information based on the electrical modulation scheme corresponding to the current optical modulation scheme.

It can be learned from the foregoing that, an architecture of the entire communication system includes two parts. A first part is that an optical signal transmitted by the optical transmitter reaches the RIS, where a channel of this part is an optical channel. The second part is that an electrical signal transmitted by the RIS arrives at the receiver, where a channel of this part is a radio channel. The receiver does not need to support optical communication, which can effectively reduce a requirement on the receiver. For example, a requirement on user software of the receiver is low, and a conventional algorithm architecture may be used to implement signal detection, data recovery, and the like. A hardware requirement on the receiver is low, and a conventional communication hardware architecture can be used. A requirement on a status of the receiver is low, and there is no special requirement on a user environment and a running status. In addition, because a communication distance of optical communication is short, and is usually in a line-of-sight range, a communication distance of the entire communication system can be prolonged by using the foregoing method.

It should be noted that in an example embodiment, the optical transmitter may be a network device, for example, an optical base station, and the receiver may be a terminal device. Alternatively, the optical transmitter may be a terminal device, and the receiver may be a network device or the like. This is not limited. The following describes the network device and the terminal device.

The network device may be a node or a device that connects the terminal device to a wireless network. For example, the network device includes but is not limited to: a base station, a next-generation NodeB (generation NodeB, gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmitting and receiving point (transmitting and receiving point, TRP), a transmitting point (TP), and/or a mobile switching center. Alternatively, the access network device may be a wireless controller, a central unit (CU), a distributed unit (DU), a central unit control plane (CU control plane, CU-CP) node, a central unit user plane (CU user plane, CU-UP) node, and/or an integrated access and backhaul (IAB) node in a cloud radio access network (CRAN) scenario. Alternatively, the access network device may be a relay station, an access point, a vehicle-mounted device, a terminal device, a wearable device, an access network device in a future 5G network, an access network device in a future evolved public land mobile network (PLMN), or the like.

The terminal device may be referred to as a terminal for short, and is a device having a wireless receiving/transmitting function. The terminal device may be mobile or fixed. The terminal device may be deployed on land, including indoor or outdoor, or handheld or vehicle-mounted; may be deployed on a water surface (for example, on a ship); or may be deployed in air (for example, on an aircraft, a balloon, and a satellite). The terminal device may be a mobile phone, a tablet computer (pad), a computer with a wireless receiving/transmitting function, a virtual reality (VR) terminal device, an augmented reality (AR) terminal device, a wireless terminal device in industrial control, a wireless terminal device in self driving, a wireless terminal device in remote medical (remote medical), a wireless terminal device in a smart grid, a wireless terminal device in transportation safety, a wireless terminal device in a smart city, and/or a wireless terminal device in a smart home. Alternatively, the terminal device may be a cellular phone, a cordless phone, a session initiation protocol (SIP) phone, a wireless local loop (WLL) station, a personal digital assistant (PDA), a handheld device or a computing device with a wireless communication function, a vehicle-mounted device, a wearable device, a terminal device in a future 5th generation (5G) network, a terminal device in a future evolved public land mobile network (PLMN), or the like. The terminal device may sometimes also be referred to as user equipment (UE). Optionally, the terminal device may communicate with a plurality of access network devices in different technologies. For example, the terminal device may communicate with an access network device supporting long term evolution (LTE), or may communicate with an access network device supporting 5G, or may be dual-connected to an access network device supporting LTE and an access network device supporting 5G. This is not limited in embodiments of the present disclosure.

Figure 4:
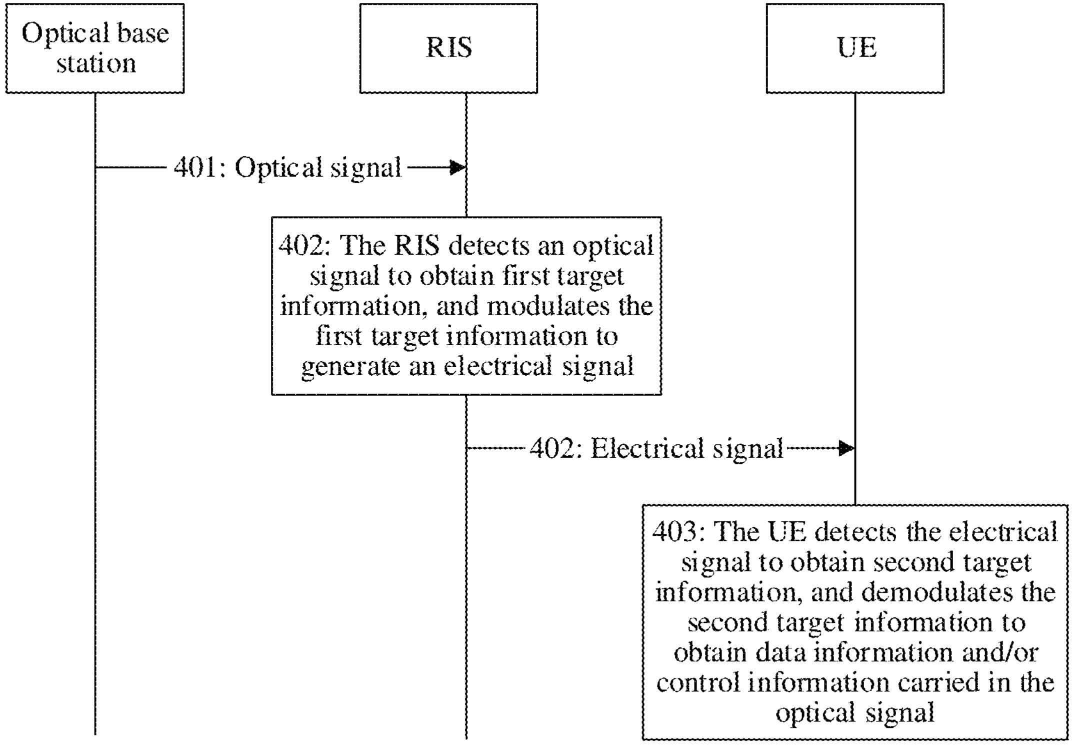
FIG. 4 is a schematic diagram of a communication method according to an embodiment of the present disclosure.

In the subsequent method description, an example in which the optical transmitter is an optical base station and the receiver is a UE is used for description. An embodiment of the present disclosure further provides a communication method. As shown in FIG. 4, the communication method includes at least the following steps.

Step 401: An optical base station sends an optical signal to an RIS. For example, the optical base station may preprocess a baseband signal, which may include encoding and modulate the base station signal, and perform optical-to-electrical conversion on a preprocessed signal. The preprocessed signal may be considered as an electrical signal, and the preprocessed electrical signal may be converted into an optical signal through optical-to-electrical conversion.

Step 402: The RIS detects the optical signal to obtain first target information, modulates the first target information to generate an electrical signal, and sends the electrical signal to UE.

For an example processing process, refer to the description in connection with FIG. 1. It should be additionally noted that, in a process of modulating the detected signal by using an electrical modulation scheme, the RIS may need to determine whether the electrical modulation scheme needs to be changed. If the electrical modulation scheme needs to be changed, the RIS updates the electrical modulation scheme, and modulates detected information by using an updated electrical modulation scheme. Alternatively, if the modulation scheme does not need to be updated, the RIS modulates the detected information by using the original modulation scheme. The original modulation scheme may be described as follows: The original modulation scheme may be prestored in the RIS, and the RIS modulates detected optical information by using the prestored modulation scheme in the RIS based on a principle of the RIS. In this case, the RIS may notify the UE of a currently used electrical modulation scheme. Alternatively, the RIS and the UE may store a correspondence between an optical modulation scheme and an electrical modulation scheme. When detecting the optical signal, the RIS may obtain a modulation scheme of the optical signal, and modulate the detected optical information by using an optical signal modulation scheme corresponding to the optical signal modulation scheme.

Step 403: The UE detects the electrical signal to obtain second target information, and demodulates the detected information to obtain data information and/or control information carried in the optical signal. For an example process in which the UE demodulates the electrical signal, refer to the foregoing description in connection with FIG. 1.

Figure 5:
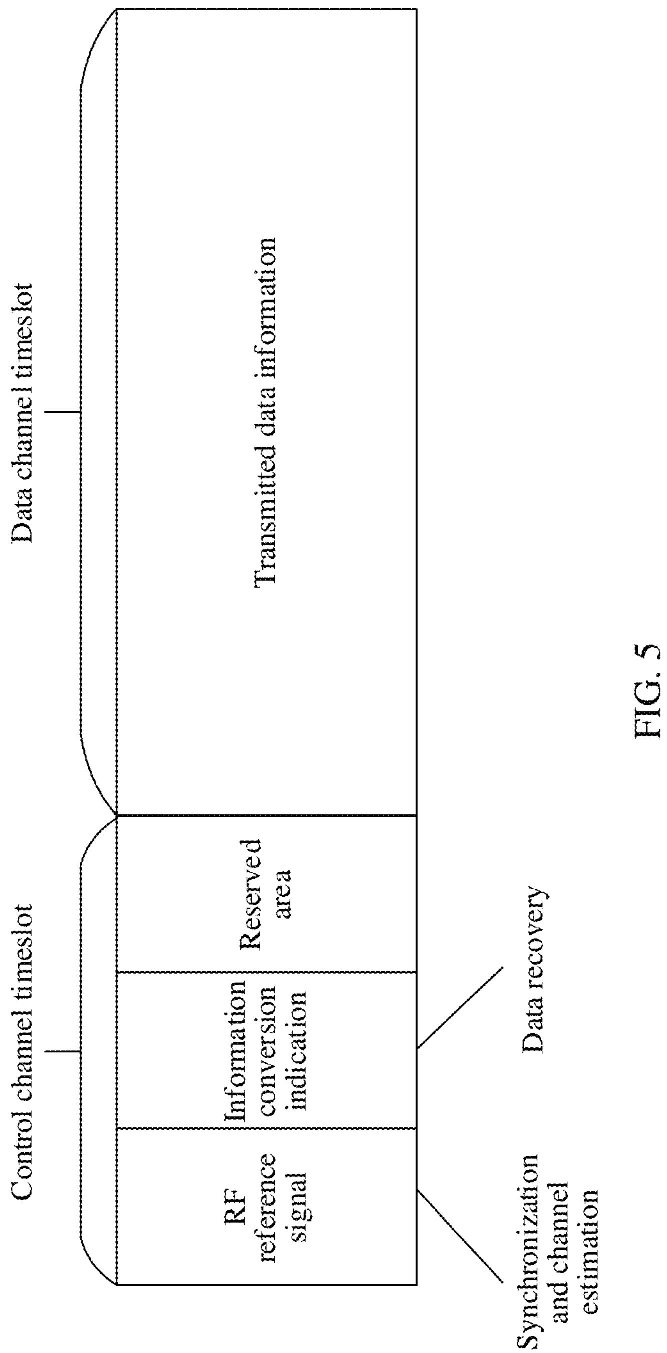
FIG. 5 is a schematic diagram of a frame structure according to an embodiment of the present disclosure.

For example, as shown in FIG. 5, a frame structure of the electrical signal provided in this embodiment may include a control channel timeslot and a data channel timeslot. The data channel timeslot may be used to transmit data information of the electrical signal, and the control channel timeslot is used to transmit:

a reference signal or an information conversion indication to the UE, where the reference signal is used to implement a function of synchronization between the UE and the RIS and estimation of a radio transmission channel between the UE and the RIS, where the estimation is used for detection of a received signal, and the information conversion indication is used to notify the UE of a modulation scheme of a current carrier modulation parameter, and notify the UE of a mapping relationship between optical modulation and current carrier modulation, and used by the UE to restore original transmission information, and the like.

Optionally, the control channel timeslot may further include a reserved area, and the reserved area may be a guard interval reserved between the control channel timeslot and the data channel timeslot.

In an example embodiment, an RIS array in the RIS may use a semi-static RIS control mode, to be specific, an external control parameter of the RIS array remains constant in a given symbol periodicity. The external control parameter of the RIS may be a function of a first analog control parameter set $\{\varphi_0\}$ and a second analog control parameter set $\{f(\varphi_1)\}$.

Figure 6:
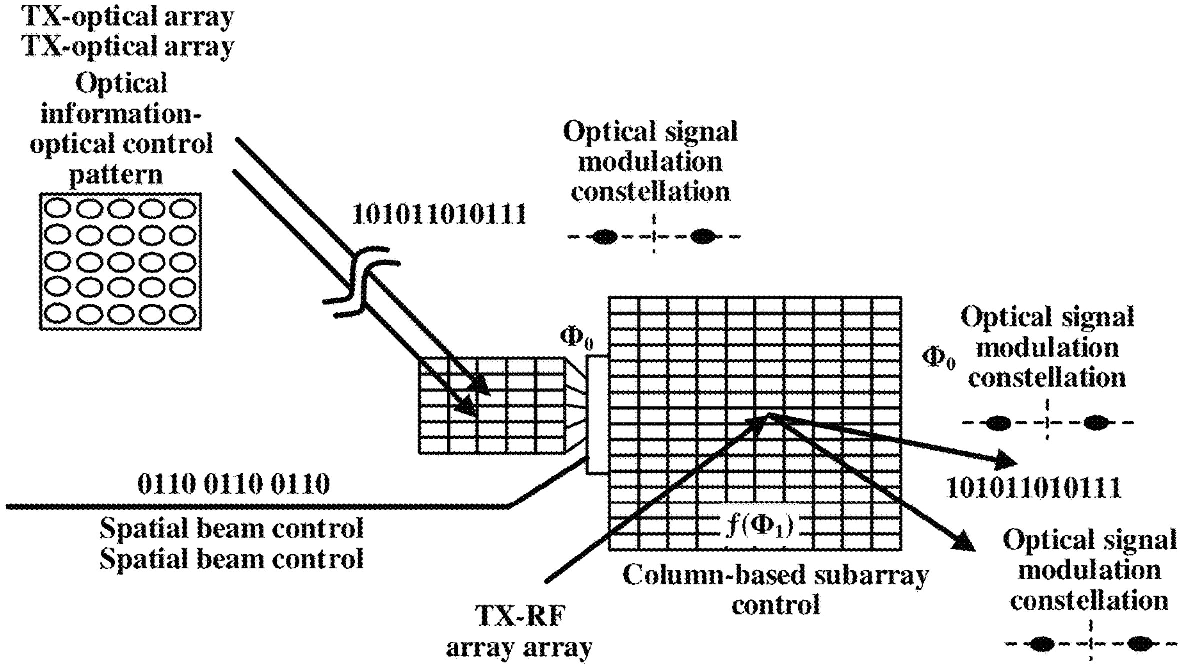
FIG. 6, FIG. 7, and FIG. 8 are schematic diagrams of RIS modulation according to an embodiment of the present disclosure.

For example, as shown in FIG. 6, the RIS may detect an arrived optical signal, for example, detect a pattern of the optical signal, and output the first analog control parameter set $\{\varphi_0\}$, where the first analog control parameter set $\{\varphi_0\}$ includes information such as the foregoing second phase and/or second amplitude. The RIS selects a proper control sequence based on beam information transmitted by a user, to generate the second analog control parameter set $\{f(\varphi_1)\}$, and control units in the RIS array based on the first analog control parameter set $\{\varphi_0\}$ and the second analog control parameter set $\{f(\varphi_1)\}$. For example, the RIS may generate a first voltage based on the first analog control parameter set $\{\varphi_0\}$ and the second analog control parameter set $\{f(\varphi_1)\}$, and control parameters of the units in the RIS array based on the first voltage. The first analog control parameter set $\{\varphi_0\}$ is used to indicate information conversion, and the second analog control parameter set $\{f(\varphi_1)\}$ is used to indicate control on a transmission direction. Through control by using the foregoing two analog control parameter sets, a converted signal can be reflected to at least one UE.

For example, a process of generating the first analog control parameter set $\{\varphi_0\}$ and the second analog control parameter set $\{f(\varphi_1)\}$ is as follows.

1. An optical signal or an optical pattern detected by an LED array in the RIS is used to control a phase of an RIS unit, and modulate phase information of a reflected carrier, for example, perform BPSK modulation on phase modulation of an incident carrier.

2. A baseband sequence is obtained through table lookup based on beam information of a user, or is obtained through calculation. A unit phase configuration matrix selected by the baseband sequence is used to control a spatial direction of transmission of a reflected electromagnetic wave. For example, single-beam or multi-beam control is implemented on a surface of the RIS to implement multicast transmission or broadcast transmission of data to a single user or a plurality of users. A beamforming transmission solution based on a radio electromagnetic wave can well support transmission in a line-of-sight or non-line-of-sight scenario.

The RIS implements conversion of a transmission signal in an analog domain, but an information modulation scheme changes during conversion of the transmission signal. For example, on-off keying (OOK) modulation in an optical domain is changed to BPSK modulation of a carrier phase. The base station may notify the UE of the information modulation conversion manner and a corresponding mapping relationship. For example, an information conversion indication area in the control channel timeslot in the frame structure shown in FIG. 5 may be used to carry the information modulation conversion manner and the corresponding mapping relationship to notify the UE of the information modulation conversion manner and the corresponding mapping relationship, so as to help the UE correctly receive data.

Figure 7:
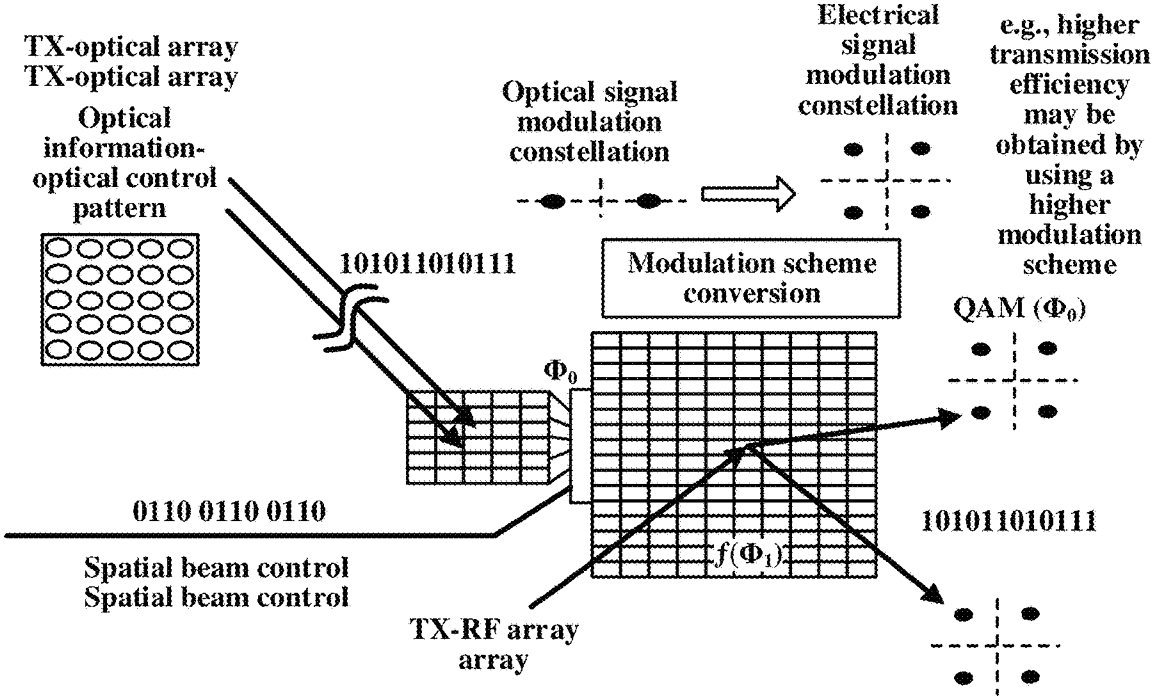

For example, as shown in FIG. 7, OOK modulation is used for data information in the optical domain, and after conversion by the RIS, quadrature phase shift keying (QPSK) modulation is implemented on a carrier phase. The UE first obtains a QPSK signal through demodulation, and then performs operations such as bit segmentation, sorting, and descrambling through OOK to recover original data information. Alternatively, the UE first obtains the QPSK signal through demodulation, then finds a mapped predefined optical pattern, recovers an optical vector signal corresponding to the optical pattern, and further recovers the original data information by using an optical modulation scheme.

Figure 8:
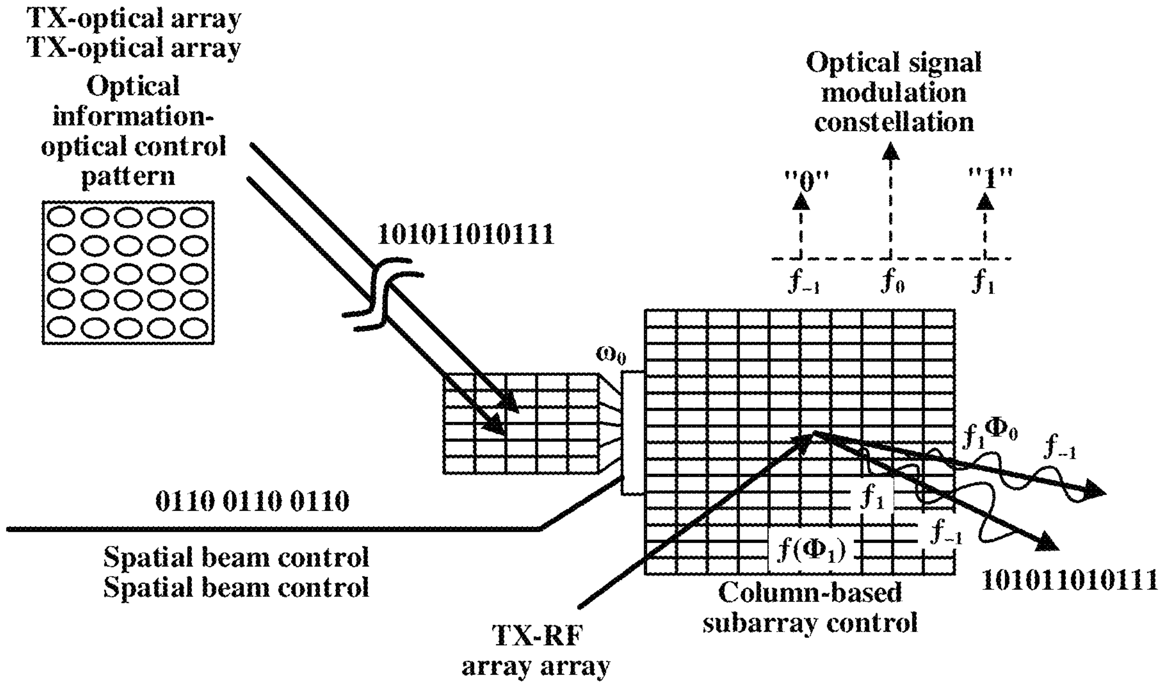

In another example embodiment, FIG. 8 shows an information conversion manner in which an RIS is adjusted and controlled based on time. A solution in which the RIS is adjusted and controlled based on time means that the external control parameter of the RIS varies with time in a given transmission symbol timeslot. Incident light may be used as an information source to implement parameter modulation on an incident electromagnetic wave of the RIS, such as phase adjustment and control, amplitude adjustment and control, spectrum and control, or polarization adjustment and control, and reflect a modulated electromagnetic wave to the UE to complete information transmission.

The RIS adjusted and controlled based on time modulates a spectrum of the incident electromagnetic wave of the RIS by using optical information. As shown in FIG. 8, a parameter of an RIS unit is configured by using the first analog control parameter set $\{\varphi_0\}$ to control a spectrum of a reflected carrier, and a surface phase of the RIS array is controlled by using the second analog control parameter $\{f(\varphi_1)\}$ to implement beam-based transmission. In this case, the UE may complete detection of a received signal, recovery of original data, and the like by using information indicated by a control channel.

It can be learned from the foregoing embodiment that, the method in this embodiment can extend an application scenario of wireless optical transmission, for example, support simultaneous transmission of a plurality of users, line-of-sight or non-line-of-sight transmission, and data transmission in a user movement scenario.

It can be understood that, in embodiments of the present disclosure, the optical transmitter, the RSI, the receiver, or the like may perform some or all of the steps in embodiments of the present disclosure. These steps or operations are merely examples. In embodiments of the present disclosure, other operations or various operation variations may be further performed. In addition, the steps may be performed in a sequence different from that presented in embodiments of the present disclosure, and not all the operations in embodiments of the present disclosure may be performed.

In embodiments of the present disclosure, unless otherwise specially stated or there is a logic conflict, terms and/or descriptions between different embodiments are consistent and may be mutually referenced, and technical features in different embodiments may be combined based on an internal logical relationship between the embodiments, to form a new embodiment.

The method provided in embodiments of the present disclosure is described in detail above with reference to FIG. 1 to FIG. 8. Apparatuses provided in embodiments of the present disclosure are described in detail below with reference to FIG. 9 and FIG. 10. It should be understood that descriptions of apparatus embodiments correspond to the descriptions of the method embodiments. Therefore, for content that is not described in detail, refer to the descriptions in the foregoing method embodiments.

Figure 9:
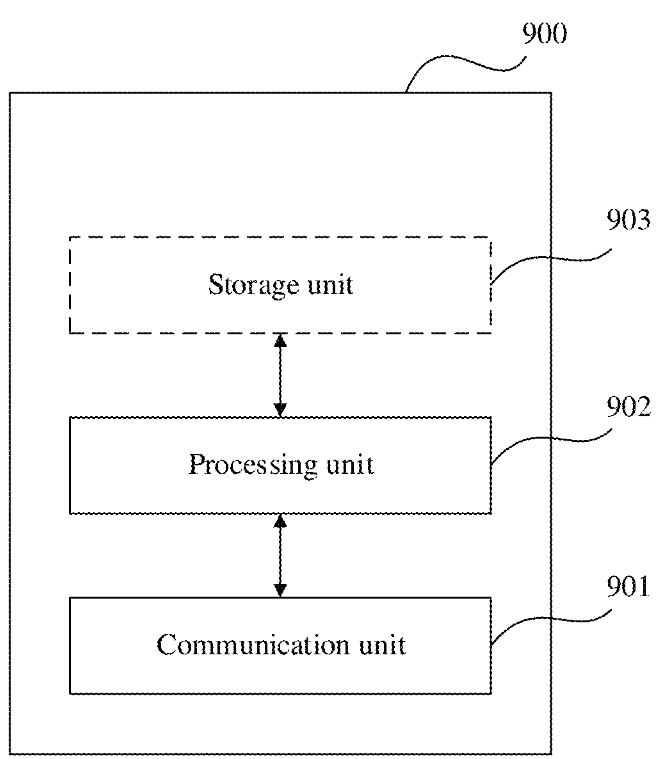
FIG. 9 and FIG. 10 are schematic diagrams of apparatuses according to embodiments of the present disclosure.

FIG. 9 is a possible block diagram of an apparatus according to an embodiment of the present disclosure. As shown in FIG. 9, the apparatus 900 may include: a communication unit 901, configured to support communication between the apparatus and another device, where optionally, the communication unit 901 is also referred to as a transceiver unit, and may include a receiving unit and/or a sending unit that are respectively configured to perform a receiving operation and a sending operation; and a processing unit 902, configured to support the apparatus in performing processing. Optionally, the apparatus 900 may further include a storage unit 903, configured to store program code and/or data of the apparatus 900.

In a first embodiment, the apparatus 900 may be a reconfigurable intelligent surface, or a module, a chip, or a circuit in a reconfigurable intelligent surface. The communication unit 901 is configured to perform receiving and sending operations of the reconfigurable intelligent surface in the foregoing method embodiments. The processing unit 902 is configured to perform processing-related operations of the reconfigurable intelligent surface in the foregoing method embodiments.

The processing unit 902 is configured to: detect an optical signal from a transmitter to obtain first target information, where the first target information is the detected optical signal; and modulate the first target information based on a modulation scheme of an electrical signal, to generate the electrical signal. The communication unit 901 is configured to send the electrical signal to a receiver.

In an example embodiment, when modulating the first target information to generate the electrical signal, the processing unit 902 is configured to: modulate the first target information based on the modulation scheme of the electrical signal, to determine first information; determine, based on correspondences between different information and voltages, a first voltage corresponding to the first information; control, based on the first voltage, parameters of units in a reconfigurable intelligent surface array included in the reconfigurable intelligent surface; and generate a carrier signal, and use the carrier signal as an incident wave to irradiate the incident wave onto the reconfigurable intelligent surface array, so that the units in the reconfigurable intelligent surface array reflect the incident wave based on the parameters of the units to generate corresponding reflected waves, where the reflected waves are the generated electrical signal.

In an example embodiment, the processing unit 902 is further configured to adjust the first information based on first beamforming information.

In an example embodiment, a frame structure of the electrical signal includes a control channel timeslot and a data channel timeslot, the data channel timeslot is used to transmit data information of the electrical signal, and the control channel timeslot is used to transmit any one of the following information: transmitting a reference signal, where the reference signal is used for synchronization between the reconfigurable intelligent surface and the receiver, and/or is used for channel estimation of the receiver; and transmitting an information conversion indication, where the information conversion indication is used to notify the receiver of a modulation scheme of a current carrier parameter and a mapping relationship between an optical modulation scheme and an electrical modulation scheme.

In an example embodiment, the control channel timeslot includes a guard area, and the guard area is a guard interval reserved between the control channel timeslot and the data channel timeslot.

In a second embodiment, the apparatus 900 may be a receiver, or a module, a chip, or a circuit in a receiver. The communication unit 901 is configured to perform receiving-related operations and sending-related operations of the receiver in the foregoing method embodiments. The processing unit 902 is configured to perform processing-related operations of the receiver in the foregoing method embodiments.

For example, the communication unit 901 is configured to receive an electrical signal from a reconfigurable intelligent surface; and the processing unit 902 is configured to: detect the electrical signal from the reconfigurable intelligent surface to obtain second target information, where the second target information is the detected electrical signal; and demodulate the second target information to obtain data information and/or control information carried in an optical signal.

In an example embodiment, when demodulating the second target information to obtain the data information and/or the control information carried in the optical signal, the processing unit 902 is further configured to: demodulate the second target information based on a modulation scheme of the electrical signal, to obtain demodulated information; and reassemble and/or descramble bits of the demodulated information based on a modulation scheme of the optical signal, to obtain the data information and/or the control information carried in the optical signal.

In an example embodiment, when demodulating the second target information to obtain the data information and/or the control information carried in the optical signal, the processing unit 902 is further configured to: demodulate the second target information based on a modulation scheme of the electrical signal, to obtain demodulated information; determine an optical signal modulation scheme corresponding to the electrical signal modulation scheme; and process the demodulated information based on an optical vector signal corresponding to the optical signal modulation scheme, to obtain the data information and/or the control information carried in the optical signal.

In an example embodiment, a frame structure of the electrical signal includes a control channel timeslot and a data channel timeslot, the data channel timeslot is used to transmit data information of the electrical signal, and the control channel timeslot is used to transmit any one of the following information: transmitting a reference signal, where the reference signal is used for synchronization between the reconfigurable intelligent surface and the receiver, and/or is used for channel estimation of the receiver; and transmitting an information conversion indication, where the information conversion indication is used to notify the receiver of a modulation scheme of a current carrier parameter and a mapping relationship between an optical modulation scheme and an electrical modulation scheme.

In an example embodiment, the control channel timeslot includes a guard area, and the guard area is a guard interval reserved between the control channel timeslot and the data channel timeslot.

It should be understood that division into the units in the apparatus is merely logical function division. During actual implementation, all or some of the units may be integrated into one physical entity or may be physically separated. In addition, the units in the apparatus may all be implemented in a form of invoking software by a processing element, or may all be implemented in a form of hardware; or some of the units may be implemented in a form of invoking software by a processing element, and some of the units may be implemented in a form of hardware. For example, the units may be separately disposed processing elements, or may be integrated into a chip of the apparatus. In addition, the unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, the operations in the foregoing method or the foregoing units may be implemented by using a hardware integrated logic circuit in the processor element, or may be implemented in a form of invoking software by a processing element.

In an example, a unit in any one of the foregoing apparatuses may be one or more integrated circuits configured to implement the foregoing method, for example, one or more application-specific integrated circuits (ASICs), one or more microprocessors (digital signal processors, DSPs), one or more field programmable gate arrays (FPGAs), or a combination of at least two of these forms of integrated circuits. For another example, when the units in the apparatus can be implemented in a form of scheduling a program by a processing element, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in a manner of a chip, the sending unit is an interface circuit that is of the chip and that is configured to send a signal to another chip or apparatus.

Figure 10:
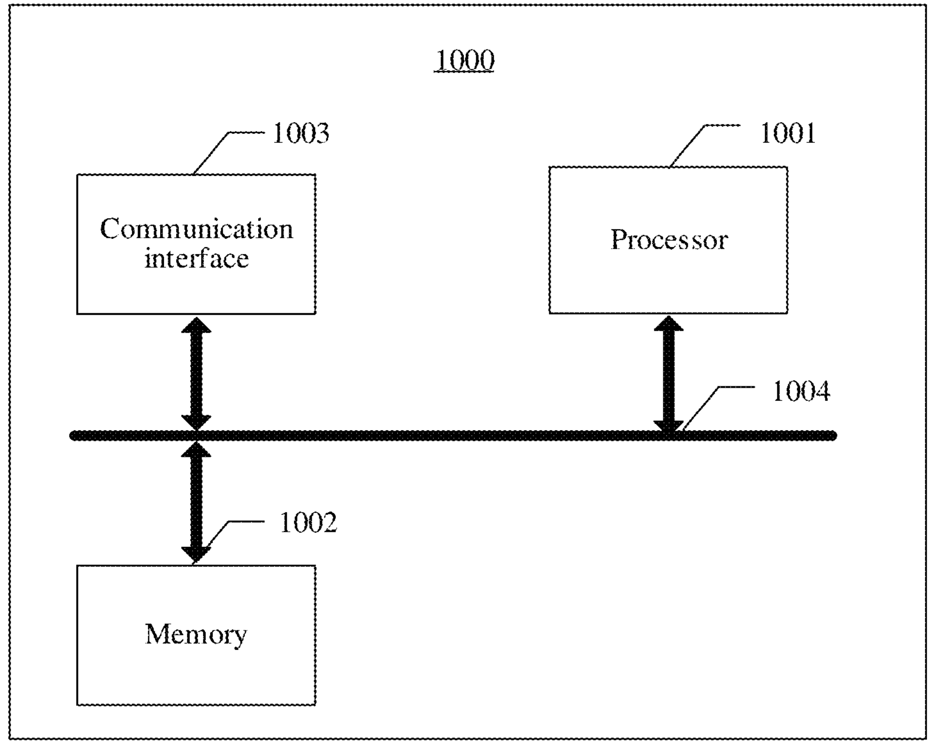

FIG. 10 is a schematic diagram of a structure of a reconfigurable intelligent surface or a receiver according to an embodiment of the present disclosure. The reconfigurable intelligent surface or the receiver includes at least one processor 1001, and may further include at least one memory 1002, configured to store program instructions and/or data. The memory 1002 is coupled to the processor 1001. The coupling in embodiments of the present disclosure may be an interval coupling or a communication connection between apparatuses, units, or modes, may be in an electrical form, a mechanical form, or another form, and is used for information exchange between the apparatuses, the units, or the modules. The processor 1001 may cooperate with the memory 1002 to perform operations, the processor 1001 may execute program instructions stored in the memory 1002, and at least one of the at least one memory 1002 may be included in the processor 1001.

The apparatus 1000 may further include a communication interface 1003, configured to communicate with another device through a transmission medium, so that the communication apparatus 1000 can communicate with the another device.

It should be understood that a connection medium between the processor 1001, the memory 1002, and the communication interface 1003 is not limited in this embodiment. In this embodiment, the memory 1002, the processor 1001, and the communication interface 1003 are connected through a communication bus 1004 in FIG. 10. The bus is represented by using a thick line in FIG. 10. A connection manner between other components is merely an example for description, and is not limited. The bus may include an address bus, a data bus, a control bus, and the like. For ease of representation, only one thick line is used to represent the bus in FIG. 10, but this does not mean that there is only one bus or only one type of bus.

The reconfigurable intelligent surface or the receiver shown in FIG. 10 can implement processes related to the reconfigurable intelligent surface or the receiver in the foregoing method embodiments. Operations and/or functions of the modules in the reconfigurable intelligent surface or the receiver shown in FIG. 10 are respectively used to implement corresponding procedures in the foregoing method embodiments. For details, refer to the descriptions in the foregoing method embodiments. To avoid repetition, detailed descriptions are properly omitted herein.

The terms "system" and "network" may be used interchangeably in embodiments of the present disclosure. "At least one" means one or more, and "a plurality of" means two or more. The term "and/or" describes an association relationship between associated objects and represents that any of three relationships may exist. For example, A and/or B may represent any of the following cases: Only A exists, both A and B exist, or only B exists, where A and B may be singular or plural. The character "/" generally indicates an "or" relationship between associated objects. The term "at least one of the following items" or a similar expression thereof means any combination of these items, including a singular item or any combination of plural items. For example, "at least one of A, B, or C" includes A, B, C, the combination of A and B, the combination of A and C, the combination of B and C, or the combination of A, B, and C. In addition, unless otherwise specified, ordinal numbers such as "first" and "second" mentioned in embodiments of the present disclosure are used to distinguish between a plurality of objects, and are not intended to limit orders, time sequences, priorities, importance degrees, or the like of the plurality of objects.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to the present disclosure without departing from the spirit and scope of the present disclosure. The present disclosure is intended to cover these modifications and variations made to the present disclosure provided that they fall within the scope of the claims and an equivalent technology thereof.

What is claimed is:

1. A communication system, comprising:

a receiver, a reconfigurable intelligent surface structure comprising a reconfigurable intelligent surface array, and a transmitter configured to send an optical signal to the reconfigurable intelligent surface structure, wherein the reconfigurable intelligent surface structure is configured to:

detect the optical signal to obtain first target information, modulate the first target information to generate an electrical signal based on the optical signal, and send the electrical signal to the receiver, the first target information being the detected optical signal; and the receiver is configured to detect the electrical signal to obtain second target information, and demodulate the second target information to obtain data information and/or control information carried in the optical signal, wherein the second target information is the detected electrical signal.

2. The communication system according to claim 1, wherein the reconfigurable intelligent surface structure is further configured to:

detect the optical signal to obtain the first target information;

modulate the first target information based on a modulation scheme of the electrical signal, to obtain first information;

determine, based on correspondences between different information and voltages, a first voltage corresponding to the first information;

control, based on the first voltage, parameters of units in the reconfigurable intelligent surface array; and generate a carrier signal, and use the carrier signal as an incident wave to irradiate the incident wave onto the reconfigurable intelligent surface array, so that the units in the reconfigurable intelligent surface array reflect the incident wave based on the parameters of the units to generate corresponding reflected waves, wherein the reflected waves are the electrical signal generated by the reconfigurable intelligent surface structure based on the optical signal.

3. The communication system according to claim 2, wherein the reconfigurable intelligent surface structure is further configured to:

adjust the first information based on first beamforming information.

4. The communication system according to claim 2, wherein the receiver is specifically configured to:

detect the electrical signal to obtain second target information;

demodulate the second target information based on the modulation scheme of the electrical signal, to obtain demodulated information; and reassemble and/or descramble bits of the demodulated information based on a modulation scheme of the optical signal, to obtain the data information and/or the control information carried in the optical signal.

5. The communication system according to claim 2, wherein the receiver is specifically configured to:

detect the electrical signal to obtain second target information;

demodulate the second target information based on the modulation scheme of the electrical signal, to obtain demodulated information;

determine an optical signal modulation scheme corresponding to the modulation scheme of the electrical signal; and process the demodulated information based on an optical vector signal corresponding to the optical signal modulation scheme, to obtain the data information and/or the control information carried in the optical signal.

6. The communication system according to claim 1, wherein a frame structure of the electrical signal comprises a control channel timeslot and a data channel timeslot;

the data channel timeslot is used to transmit data information of the electrical signal; and the control channel timeslot is used to transmit a reference signal or an information conversion indication, wherein the reference signal is used for synchronization between the reconfigurable intelligent surface structure and the receiver, and/or channel estimation of the receiver, and the information conversion indication is used to notify the receiver of a modulation scheme of a current carrier parameter and a mapping relationship between an optical modulation scheme and an electrical modulation scheme.

7. The communication system according to claim 6, wherein the control channel timeslot comprises a guard area, and the guard area is a guard interval reserved between the control channel timeslot and the data channel timeslot.

8. A reconfigurable intelligent surface apparatus, comprising: at least one processor, and one or more memories coupled to the at least one processor and storing programming instructions that, when executed by the at least one processor, cause the reconfigurable intelligent surface apparatus to perform operations comprising:

detecting an optical signal from a transmitter to obtain first target information, wherein the first target information is the detected optical signal;

modulating the first target information based on a modulation scheme of an electrical signal, to generate the electrical signal; and sending the electrical signal to a receiver.

9. The reconfigurable intelligent surface apparatus according to claim 8, wherein modulating the first target information to generate the electrical signal comprises:

modulating the first target information based on the modulation scheme of the electrical signal, to determine first information;

determining, based on correspondences between different information and voltages, a first voltage corresponding to the first information;

controlling, based on the first voltage, parameters of units in a reconfigurable intelligent surface array comprised in the reconfigurable intelligent surface apparatus; and generating a carrier signal, and using the carrier signal as an incident wave to irradiate the incident wave onto the reconfigurable intelligent surface array, so that the units in the reconfigurable intelligent surface array reflect the incident wave based on the parameters of the units to generate corresponding reflected waves, wherein the reflected waves are the generated electrical signal.

10. The reconfigurable intelligent surface apparatus according to claim 9, wherein the operations further comprise:

adjusting the first information based on first beamforming information.

11. The reconfigurable intelligent surface apparatus according to claim 8, wherein a frame structure of the electrical signal comprises a control channel timeslot and a data channel timeslot;

the data channel timeslot is used to transmit data information of the electrical signal; and the control channel timeslot is used to transmit a reference signal or an information conversion indication, wherein the reference signal is used for synchronization between the reconfigurable intelligent surface apparatus and the receiver, and/or channel estimation of the receiver, and the information conversion indication is used to notify the receiver of a modulation scheme of a current carrier parameter and a mapping relationship between an optical modulation scheme and an electrical modulation scheme.

12. The reconfigurable intelligent surface apparatus according to claim 11, wherein the control channel timeslot comprises a guard area, and the guard area is a guard interval reserved between the control channel timeslot and the data channel timeslot.

13. A receiver, comprising: at least one processor, and one or more memories coupled to the at least one processor and storing programming instructions that, when executed by the at least one processor, cause the receiver to perform operations comprising:

receiving an electrical signal from a reconfigurable intelligent surface structure wherein the reconfigurable intelligent surface structure comprises a reconfigurable intelligent surface array and is configured to detect an optical signal and generate the electrical signal based on the optical signal;

detecting the electrical signal from the reconfigurable intelligent surface structure to obtain target information, wherein the target information is the detected electrical signal; and demodulating the target information to obtain data information and/or control information carried in an optical signal.

14. The receiver according to claim 13, wherein demodulating the target information to obtain the data information and/or the control information carried in the optical signal comprises:

demodulating the target information based on a modulation scheme of the electrical signal, to obtain demodulated information; and reassembling and/or descrambling bits of the demodulated information based on a modulation scheme of the optical signal, to obtain the data information and/or the control information carried in the optical signal.

15. The receiver according to claim 13, wherein demodulating the target information to obtain the data information and/or the control information carried in the optical signal comprises:

demodulating the target information based on a modulation scheme of the electrical signal, to obtain demodulated information;

determining an optical signal modulation scheme corresponding to the modulation scheme of the electrical signal; and processing the demodulated information based on an optical vector signal corresponding to the optical signal modulation scheme, to obtain the data information and/or the control information carried in the optical signal.

16. The receiver according to claim 13, wherein a frame structure of the electrical signal comprises a control channel timeslot and a data channel timeslot;

the data channel timeslot is used to transmit data information of the electrical signal; and the control channel timeslot is used to transmit a reference signal or an information conversion indication, wherein the reference signal is used for synchronization between the reconfigurable intelligent surface structure and the receiver, and/or channel estimation of the receiver, and the information conversion indication is used to notify the receiver of a modulation scheme of a current carrier parameter and a mapping relationship between an optical modulation scheme and an electrical modulation scheme.

17. The receiver according to claim 16, wherein the control channel timeslot comprises a guard area, and the guard area is a guard interval reserved between the control channel timeslot and the data channel timeslot.

* * * * *